United States Patent [19]

Varga et al.

[11] Patent Number: 5,311,192
[45] Date of Patent: May 10, 1994

[54] POLARIZATION ECCM TECHNIQUE FOR RADAR SYSTEMS

[75] Inventors: Ben B. Varga; Douglas G. DeWolf, both of Los Angeles, Calif.

[73] Assignee: Hughes Aircraft Company, Los Angeles, Calif.

[21] Appl. No.: 293,032

[22] Filed: Jan. 3, 1989

[51] Int. Cl.$^5$ ............................................. G01S 7/36
[52] U.S. Cl. .................................... 342/188; 342/17; 342/19; 342/159
[58] Field of Search ................ 342/16, 17, 188, 18, 342/19, 159, 195, 149

[56] References Cited

U.S. PATENT DOCUMENTS

| | | | |
|---|---|---|---|
| 3,921,171 | 11/1975 | Strother, Jr. et al. | 342/150 |
| 3,986,188 | 10/1976 | True | 342/14 |
| 4,107,682 | 8/1978 | Boucher et al. | 342/17 |
| 4,183,023 | 1/1980 | Holman | 342/16 |
| 4,335,387 | 6/1982 | Salvat et al. | 342/16 X |
| 4,673,943 | 6/1987 | Hannan | 342/367 |
| 4,935,743 | 6/1990 | Guilhem et al. | 342/17 |
| 5,049,888 | 9/1991 | Prenat | 342/149 |

OTHER PUBLICATIONS

I. S. Keed, et al, "Rapid Convergence Rate in Adaptive Arrays", IEEE Trans. Aero & Elec. Sys., vol. AES-10, No. 6, Nov. 1974 pp. 853-863.

Primary Examiner—John B. Sotomayor
Attorney, Agent, or Firm—L. A. Alkov; W. K. Denson-Low

[57] ABSTRACT

A process for cancelling the effects of noise jamming in a radar system having a dual-polarization monopulse antenna, a computer processor, and target detection algorithms, wherein the noise jamming produced by a hostile electronic countermeasure on a target is cancelled so as to detect the target in the optimum detection channel. The process consists of the steps of receiving signals from multiple monopulse polarization aperture combinations of the radar antenna, sampling the signals from the radar antenna, digitizing the sampled signals, calculating combination values based upon the samples of the digitized signals, computing several potential target detection channel signals based upon the combination values and samples of the digitized signals, applying the detection channel signals to the computer processor and selecting the optimum detection channel signal for detection of the target using the computer processing whereby the signal is then applied to target detection algorithm of the radar processor.

4 Claims, 3 Drawing Sheets

POLARIZATION ECCM TECHNIQUE FOR RADAR SYSTEMS

This invention was made with Government support under U.S. Government Contract No. F30602-83-C-0126 awarded by the Department of Defense. The Government has certain rights in this invention.

FIELD OF THE INVENTION

The invention relates to radar Electronic Counter-Counter Measure (ECCM) techniques, and in particular to ECCM techniques against traditional and advanced noise (blinking and polarization agile) Electronic Counter Measure (ECM) jammers.

BACKGROUND OF THE INVENTION

In modern radar electronic warfare, a variety of counter-measures are used by hostile or enemy targets to avoid detection and/or deny range information, the distance between the aircraft and the target. For example, a pilot of an enemy aircraft with an on-board or escort ECM system wishes to avoid being prey to a missile by denying range for missile launch envelope calculation by another radar. A typical radar ECM is the noise jammer which conventionally broadcasts random in-band electronic energy to overcome for a period of time the ability of a victim radar system to detect and obtain range measurements of, or range on, the target being protected by the noise. Methods have been devised to overcome this kind of jamming, as for example, the polarization canceller. Recently, rapidly blinking and polarization agile noise jamming ECM techniques have been developed. Blinking jamming results when the enemy jammer periodically broadcasts powerful noise energy to defeat conventional polarization canceller ECCM techniques with rapid blink rates, because as the radar system's receive polarization adjusts to the jamming noise, the noise disappears. In polarization agile noise, the enemy ECM system switches rapidly between different polarizations of antennas. Conventional Polarization canceller ECCM for noise jamming fails for this jamming technique as well, when it is too rapidly agile, because as the radar system becomes accustomed to one polarization, another polarization is transmitted by the hostile target.

Furthermore, conventional polarization ECCMs for noise jamming techniques do not operate well with multiple jammers in the antenna main lobe. Such techniques are configured to cancel only single jammers in the main lobe, and are ineffective against multiple jammers.

Consequently, it would be an advance in the art for radars to be able to and cancel the effects of multiple noise jammers in the main lobe order to range on and track enemy targets in range and doppler.

SUMMARY OF THE INVENTION

An object of the present invention is to provide an ECCM process in a radar system to counter or cancel the effects of blinking noise jamming as used by a hostile target or escort platform to avoid ranging or tracking in range and doppler.

Another object of the present invention is to provide an ECCM process in a radar system to counter or cancel the effects of polarization agile noise jamming by a hostile target or escort platform.

Yet another object of the invention is to provide an ECCM process in a radar system to cancel-multiple hostile jammers located in the antenna main lobe, so as to detect and range on targets.

Digital polarization cancellation has several advantages over analog cancellers. The digital data can be stored, combined to null the interfering polarization, and reprocessed for target detection. Digital processing can be made adaptive and flexible, thereby allowing any changes in jammer polarization to be detected and compensated; clutter notches can be brought in and out, and cancelling of clutter from ground, rain and chaff reflections can be done adaptively in range. For a wideband jamming signal whose polarization varies with frequency, the digital polarization canceller can combine the channels with different coefficients in different RF subbands to achieve maximum jammer cancellation in each subband.

The present invention provides a process for the cancellation of the effects of noise jamming from multiple jammers in the antenna main lobe, including blinking and polarization agile radar electronic counter-measures. The two basic ideas of the ECCM process involve (i) using both co- and cross-polarized monopulse antenna channels to cancel noise jamming from the copolarized (transmit) sum channel and (ii) calculating several polarization adaptive cancellation weights and selecting the optimum weight for each digital sample in the computer signal processor.

The present invention provides that for a radar system having a dual-polarization monopulse antenna with sum ($\Sigma$) and difference ($\Delta$) apertures, multiple A/D converters and a digital computer processor, with target detection algorithm, the process for cancelling the effects of noise jamming produced by hostile ECM on a target or escort platform, in order to detect targets with optimum detection channel signal, consisting of the step (1) obtaining signals from dual-polarization monopulse sub-aperture combinations of the antenna; (2) sampling the signals from the antenna; (3) digitizing the sampled signals; (4) calculating combination values based upon the digitized samples of the signals; (5) computing several target detection channel signals based upon the combination values and the samples of the digitized signals to obtain maximum target-to-jammer ratio; (6) applying the potential detection channel signals to a selection algorithm; and (7) selecting the optimum detection channel signal (which represents the best combination of dual-polarized monopulse subapertures) for target detection. In the target detection algorithm selection, the samples of the digitized signals are divided into "early" and "late" values in range bins or samples and the detection channel selection is based upon calculated ratio values of residual powers calculated via "early" and "late" combination weights.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
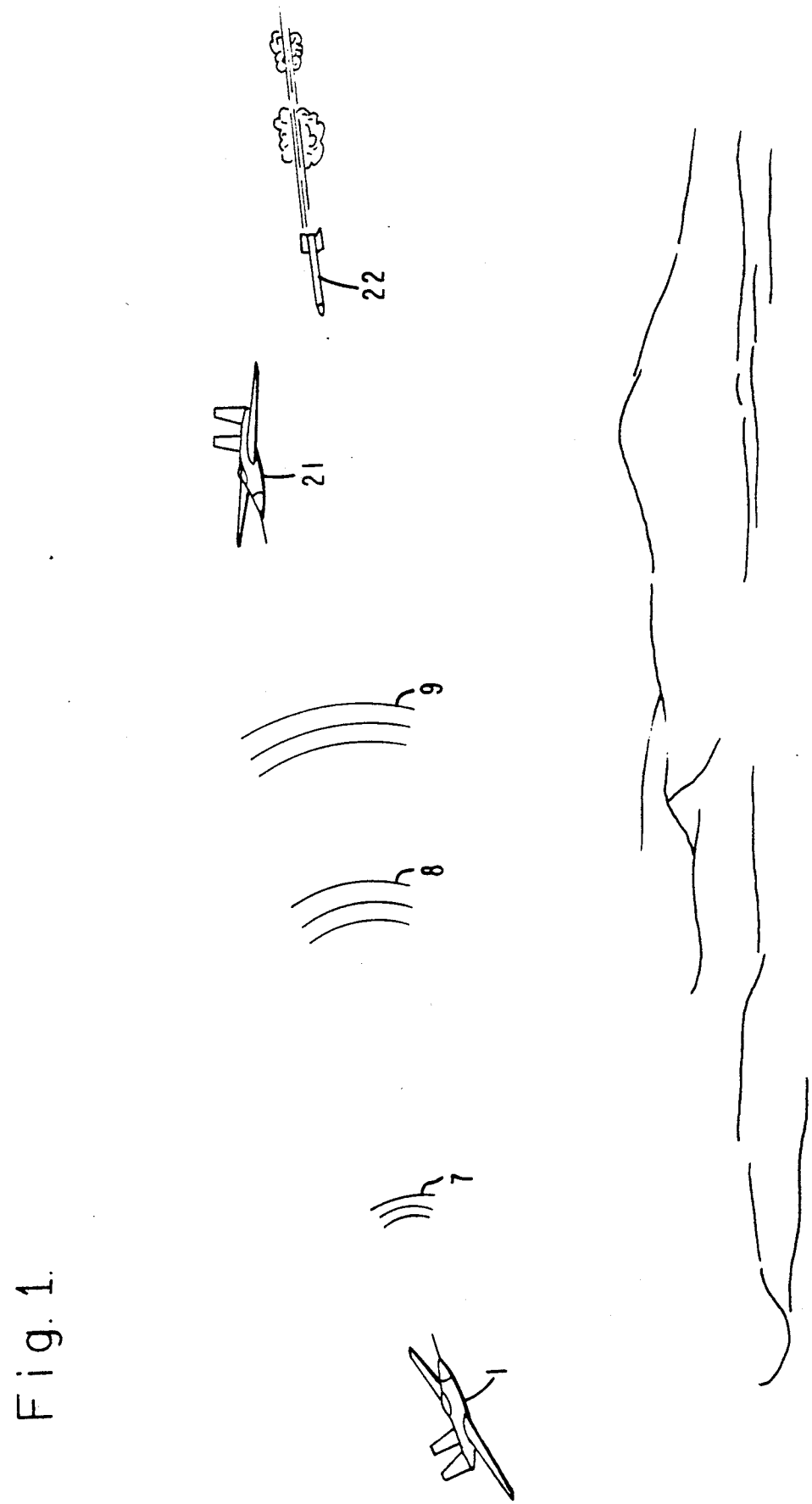
FIG. 1 pictorially illustrates an encounter between friendly and hostile aircraft wherein the hostile aircraft is employing electronic counter measures to deny range information.

Polarization cancellation is an ECCM technique whereby the effective receive polarization of a radar antenna is adjusted to be orthogonal to that of an interfering polarization noise jammer. Effective polarization refers to the linear combination of signals from two independently (usually orthogonal) polarized antennas in the aperture. The linear combination can be accomplished at radio frequency (RF) or IF or digitally on the complex video data. The jammer, which may be in the mainlobe or the sidelobe, is assumed to maintain a constant polarization during the short time interval needed to gather sufficient data for establishing adequate cancellation; that is, for calculating the appropriate weights (amplitude and phase) to establish the appropriate linear combination of dual polarized incoming signals. The target return is assumed to be primarily on one of the receive antenna polarizations, depending on the transmitted polarization.

The invention will be described in terms of the general theoretical description, preferred embodiment, other suggested embodiments.

1. Theory of the invention

In general, the invention contemplates forming a residual signal y(t), which is a function of time, t, which signal is used for radar target ranging and tracking. The residual signal represents the effect of cancelling the jamming from the basic target detection channel (copolarized $\Sigma$-channel) using the co- and cross-polarized difference ($\Delta$) channels and the cross-polarized $\Sigma$-channel. When a noise jammer illuminates the radar, the signal y(t), which is evolved from received energy from the radar antenna, is contaminated because of the jamming. In order to cancel the effect of such jamming, develop a signal vector $x(t_n)$, at time sample $t_n$, of for example, four components, $$x(t_n) = \begin{bmatrix} x_1(t) \\ x_2(t) \\ x_3(t) \\ x_4(t) \end{bmatrix}$$

wherein each component represents a signal from a different aperture/polarization combination of the radar antenna.

Electronic signals from the antenna are generally represented by combinations of energy from the antenna sum and difference channels or apertures. Another convention is to use monopulse antenna azimuth and elevation difference channel signals resulting from energy received from the antenna, such as $\Delta_{Az}$ and $\Delta_{El}$.

For example, the components represent the incoming complex video digital signals in the sum ($\Sigma$) antenna vertical and horizontal polarization channels, as represented by $x_1(t_n)$ and $x_2(t_n)$, respectively, are represented as follows:

$$x_1(t_n) = S(t_n) + \sum_i \Sigma_i J_i(t_n) + N_1(t_n)$$

-continued $$x_2(t_n) = \sum_i \alpha_i \Sigma_i J_i(t_n) + N_2(t_n)$$

where $S(t_n)$ is the target copolarized return signal at time t for the $n^{th}$ range bin (or sample number 1 in the Pulse Repetition Interval (PRI), (with neglect of depolarization on backscatter), $j_i(t_n)$ denotes the i-th jammer signal sample at time $t_n$ (with $\Sigma_i$ the sum channel voltage gain towards the jammer), and $N_1(t_n)$ and $N_2(t)$ represent the thermal noise value at time t. The coefficient $\alpha_i$ represents the i-th jammer signal in the horizontal polarization channel (relative to the vertical polarization channel) depending upon the jammer polarization: for example, for right (left) circularly polarized jamming it is j(−j), while for slant 45° (or −45°) polarization is ±1.

The difference ($\Delta$) antenna vertical and horizontal polarization channels are represented by similar equations for the components for the incoming video digital signals $x_3(t_n)$ and $x_4(t_n)$, respectively, as follows:

$$x_3(t_n) = D(t_n) + \sum_i \Delta_i J_i(t_n) + N_3(t_n)$$

$$x_4(t_n) = \sum_i \alpha_i \Delta_i J_i(t_n) + N_4(t_n)$$

where $D(t_n)$ is the copolarized target return signal at time t for the nth range bin (or sample number) in the PRI, with neglect of depolarization on backscatter, $J_i(t_n)$ denotes the i-th jammer signal sample at time $t_n$ and $N_3(t_n)$ and $N_4(t_n)$ represent thermal noise value at time $t_n$.

Covariance matrix estimates, $R_{xE}$, for "early" samples, i.e., samples preceding sample n under test for target presence, $x(t_n)$, and $R_{xL}$, for "late" samples, i.e., samples following sample n under test for target presence, $x(t_n)$, are calculated as follows:

$$\hat{R}_{xE} = \frac{1}{N} \sum_{m=1}^{N} x(t_{n-m}) x^t(t_{n-m})$$

$$\hat{R}_{xL} = \frac{1}{N} \sum_{m=1}^{N} x(t_{n+m}) x^t(t_{n+m})$$

and cross-correlation vectors $R_{xx1E}$ for "early" samples $x(t_{n-m})$ and $R_{xx1L}$ for "late" samples $x(t_{n+m})$ for testing target presence in sample n as follows:

$$\hat{R}_{xx1E} = \frac{1}{N} \sum_{m=1}^{N} x(t_{n-m}) x_1^*(t_{n-m})$$

$$\hat{R}_{xx1L} = \frac{1}{N} \sum_{m=1}^{N} x^*(t_{n+m}) x_1(t_{n+m})$$

Weighting functions based on sample-matrix inversion are calculated as follows:

$$\hat{W}_E = \hat{R}_{xE}^{-1} \hat{R}_{xx1E}$$
$$\hat{W}_L = \hat{R}_{xL}^{-1} \hat{R}_{xx1L}$$

wherein the normalized weighting functions are in the form of vectors, $$\hat{W}_E = \begin{bmatrix} W^1_{1E} \\ W_{2E} \\ W_{3E} \end{bmatrix}$$

$$\hat{W}_L = \begin{bmatrix} W^1_{1L} \\ W_{2L} \\ W_{3L} \end{bmatrix}$$

and a third weighting function is calculated as the mean:

$$\hat{W}_0 = \frac{1}{2}(\hat{W}_E + \hat{W}_L) = \begin{bmatrix} W^1_{10} \\ W_{20} \\ W_{30} \end{bmatrix}$$

"Early" samples $x(t_k)$ are defined as signal samples $x(t_{n-m})$, $$x(t_{n-N}), \ldots x(t_{n-1})$$

and "late" samples $x(t_k)$ are defined as signal samples $x(t_{n+m})$, $$x(t_{n+1}), \ldots x(t_{n+N})$$

where N is the number of sample points in a "Sliding window" and n is an index. In employing the invention in a radar system, the samples can correspond to range bins in low pulse repetition frequency (low PRF) modes or to pulse repetition intervals (PRI's) for high pulse repetition frequency (HPRF) modes, or to both range bins and PRI in medium pulse repetition frequency (MPRF) and range-gated HPRF (RGHPRF) modes.

The above process is called a "sliding window" technique.

The process then calculates the following residual quantities or combination values for application of polarization agile logic:

$$y_E(t_K) = x_1(t_K) - W_{1E}x_2(t_K) - W_{2E}x_3(t_K) - W_{3E}x_4(t_K)$$
$$y_L(t_K) = x_1(t_K) - W_{1L}x_2(t_K) - W_{2L}x_3(t_K) - W_{3L}x_4(t_K)$$

$$y_O(t_K) = x_1(t_K) - W_{10}x_2(t_K) - W_{20}x_3(t_K) - W_{30}x_4(t_K)$$
$$= \frac{1}{2}(y_E(t_K) + y_L(t_K))$$

$$P_E(t_K) = |y_E(t_k)|^2$$
$$P_L(t_K) = |y_L(t_k)|^2$$

The invention specifies the following polarization agile logic of operation for generating the optimum detection channels signal, $y(t_K)$, for target detection:

if $\dfrac{P_L(t_K)}{P_E(t_K)} < \gamma$ then, $y(y_k) = y_L(t_k);$ or if $\dfrac{P_E(t_K)}{P_L(t_K)} < \gamma$ then, $y(t_K) = y_E(t_K);$ or else $y(t_K) = y_O(t_K)$ where $\gamma$ is a threshold ratio, generally approximately equal to 0.1.

2. Preferred Embodiment of the Invention

The preferred embodiment of the invention at the time of filing an application for patent is discussed. FIG. 1 depicts an encounter between friendly and hostile aircraft. Hostile aircraft 1 is depicted to radiate energy, as indicated by electronic wave energy 7, 8, and 9 to avoid detection and/or ranging by friendly aircraft 21 and prevent missile 22 from being launched within its envelope of effectiveness.

Figure 2:
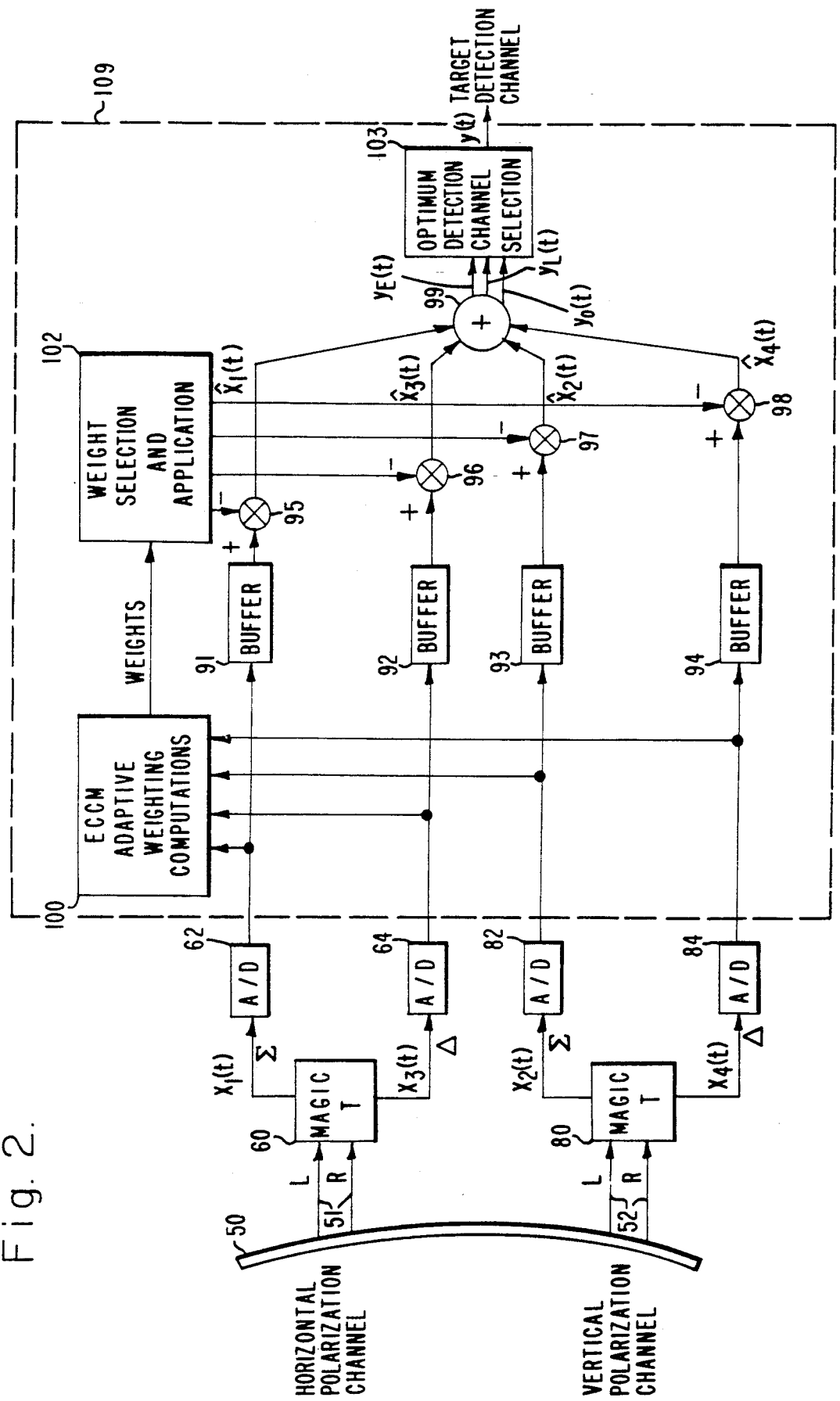
FIG. 2 illustrates a generalized block diagram of a radar system incorporating the present invention.

FIG. 2 depicts a radar system having a dual-polarized monopulse antenna, multiple A/D converters (62, 64, 82, 84), and a digital computer processor for practicing the present invention. Main antenna 50 is shown to comprise a horizontal polarization channel 51 and a vertical polarization channel 52. The horizontal polarization channel 51 comprises a left aperture L signal and a right aperture R signal, as does the vertical polarization channel. Note that the two polarizations may share common left and right apertures. For the horizontal polarization channel, the L and R signals are coupled to Magic T 60 which operates on the L and R signals to separate the Σ signal from the Δ signal for purposes of future calculations. Similarly for the vertical polarization channel 52 of main antenna 50, the L and R signals are coupled to Magic T 80 which separate the Σ signal from the Δ signal for calculation purposes. The two polarizations may share common left and right apertures. Magic T 60 and Magic T 80 are standard configurations in the radar art, as described in Principles of Microwave Circuits, Edited by C. G. Montgomery, R. H. Dicke and E. M. Purcell, published by McGraw-Hill Book Company, Inc. 1984, pages 306–307.

As shown in FIG. 2, $x_1(t)$ and $x_2(t)$, therefore, represent the incoming complex video digital signals in the same (Σ) main antenna 50, horizontal polarization channel 51 and vertical polarization channel 52, respectively. Similarly, the signals $x_3(t)$ and $x_4(t)$, therefore, represent the incoming complex video digital signals in the difference (Δ) main antenna 50, horizontal polarization channel 51, and vertical polarization channel 52, respectively.

FIG. 2 depicts each of these electronic signals $x_1(t)$, $x_2(t)$, $x_3(t)$, and $x_4(t)$ being applied to special purpose computer 109. In radar systems, computer 109 may contain software, and generally would be known as a Programmable Signal Processor (PSP); or be hardwired and generally would be known as a Radar Signal Processor (RDP), for example. In computer 109, the signals are coupled to ECCM Adaptive Weighting Computation function 100 through analog-to-digital (A/D) devices 62 for $x_1(t)$, 64 for $x_2(t)$, 82 for $x_3(t)$, 84 for $x_4(t)$. A/D devices are well known in the art. The signals are also individually applied to Buffers 91–94; $x_1(t)$ to Buffer 91, $x_2(t)$ to Buffer 92, $x_3(t)$ to Buffer 93, and $x_4(t)$ to Buffer 94. Buffers 91–94 generally represent digital memory as part of the global bulk memory of computer 109. Such memory is used for storing or holding data until a further sequential operation is done with the data stored.

ECCM Adaptive Weighting Computations function 100 computes covariance matrix estimates $R_{xE}$ for "early" samples and $R_{xL}$ for "late" samples, as explained above. The method for covariance calculation is well known in the art. For example, the method is discussed in an article entitled "Rapid Convergence in Adaptive Arrays" by I. Reed, J. Mallett, and L. Brennan, *IEEE Transactions on Aerospace and Electronic Systems*, Vol. AES-10, No.6, November 1974, at pages 853–863. Function 100 also calculates cross-correlation vectors $R_{xx1E}$ for "early" samples $x(t_{n-m})$, and and $R_{xxL}$ for "late" samples $x(t_{n-m})$ as discussed above.

Using the result of the calculations of $R_{xE}$ and $R_{xx1E}$, function 100 then calculates a weighting functions $\hat{W}_E$ and $\hat{W}_L$ as follows:

$$\hat{W}_E = \hat{R}_{xE}^{-1} \hat{R}_{xx1E}$$

$$\hat{W}_L = R_{xL}^{-1} R_{xx1L}$$

Weighting function $W_E$ is represented by the following normalized vector:

$$\hat{W}_E = \begin{bmatrix} w^1_{1E} \\ w_{2E} \\ w_{3E} \end{bmatrix}$$

Weighting function $W_L$ is represented by the following normalized vector:

$$\hat{W}_L = \begin{bmatrix} w^1_{1L} \\ w_{2L} \\ w_{3L} \end{bmatrix}$$

Calculations for the above $\hat{W}_E$ and $\hat{W}_L$ are well known in the art, as described in an article entitled "Rapid convergence in Adaptive Arrays" by I. Reed, J. Mallett, and L. Brennan, IEEE Transactions on Aerospace and Electronic Systems, Vol. AES-10, No.6, November 1974, Pages 853–863.

Weighting functions $\hat{W}_E$ and $\hat{W}_L$ are then applied to Weight Selection and Application function 102. Function 102 in connection with multipliers 95, 96, and 97, and Summer 99 calculates residual quantities for application of polarization agile logic, which quantities are $Y_E(t_k)$, $Y_L(t_k)$ and $Y_0(t_k)$, as shown in FIG. 2.

Specifically, these quantities of weighting functions $\hat{W}_E$ and $\hat{W}_L$ are respectively applied to signals $x_1(t)$, $x_2(t)$, $x_3(t)$, and $x_4(t)$, through multipliers 95, 96, and 97 and adder 99, as shown in FIG. 2, as follows:

$$y_E(t_K) = x_1(t_K) - W_{1E}x_2(t_K) - W_{2E}x_3(t_K) - W_{3E}x_4(t_K)$$

$$y_L(t_K) = x_1(t_K) - W_{1L}x_2(t_K) - W_{2L}x_3(t_K) - W_{3L}x_4(t_K)$$

$$y_O(t_K) = x_1(t_K) - W_{10}x_2(t_K) - W_{20}x_3(t_K) - W_{30}x_4(t_K)$$

$$= \frac{1}{2}(y_E(t_K) + y_L(t_K))$$

The residual quantities $y_E(t_K)$, $y_L(t_K)$ and $y_0(t_K)$ are applied to Optimum Detection Channel function 103. The quantities $P_E(t_k)$ and $P_L(t_K)$ are computed by function 103 as follows:

$$P_E(t_K) = |y_E(t_k)|^2$$

$$P_L(t_K) = |y_L(t_k)|^2$$

Finally $y(t_K)$ is selected according to the following algorithm presented from $y_E(t_K)$, $y_L(t_K)$ and $y_0(t_K)$, as done by Optimum Detection Channel Selection function 103 of FIG. 2:

$$\text{if } \frac{P_L(t_K)}{P_E(t_K)} < \gamma$$

then $y(t_K) = y_L(t_K)$; or if $$\frac{P_E(t_K)}{P_L(t_K)} < \gamma$$

then $y(t_K) = y_E(t_K)$; or else $y(t_K) = y_0(t_K)$, if both ratios are $> \gamma$.

The multiplication of the elements of the vector quantities with the signal quantities is done by well-known techniques, software programs by a computer or by hardware components.

As shown in FIG. 2, the respective signals $\tilde{X}_1(t)$, $\tilde{x}_2(t)$m $\tilde{x}_3(t)$, and $\tilde{x}_4(t)$ are applied respectively to Buffers 91–94. The respective signals $\hat{x}_1(t)$, $\hat{x}_2(t)$, $\hat{x}_3(t)$, and $\hat{x}_4(t)$ are then weighted counterparts by way of multipliers 95, 96, 97 and 98. The output signal of summer 99 serves as the input signal to the radar system target detection channel.

Figure 3:
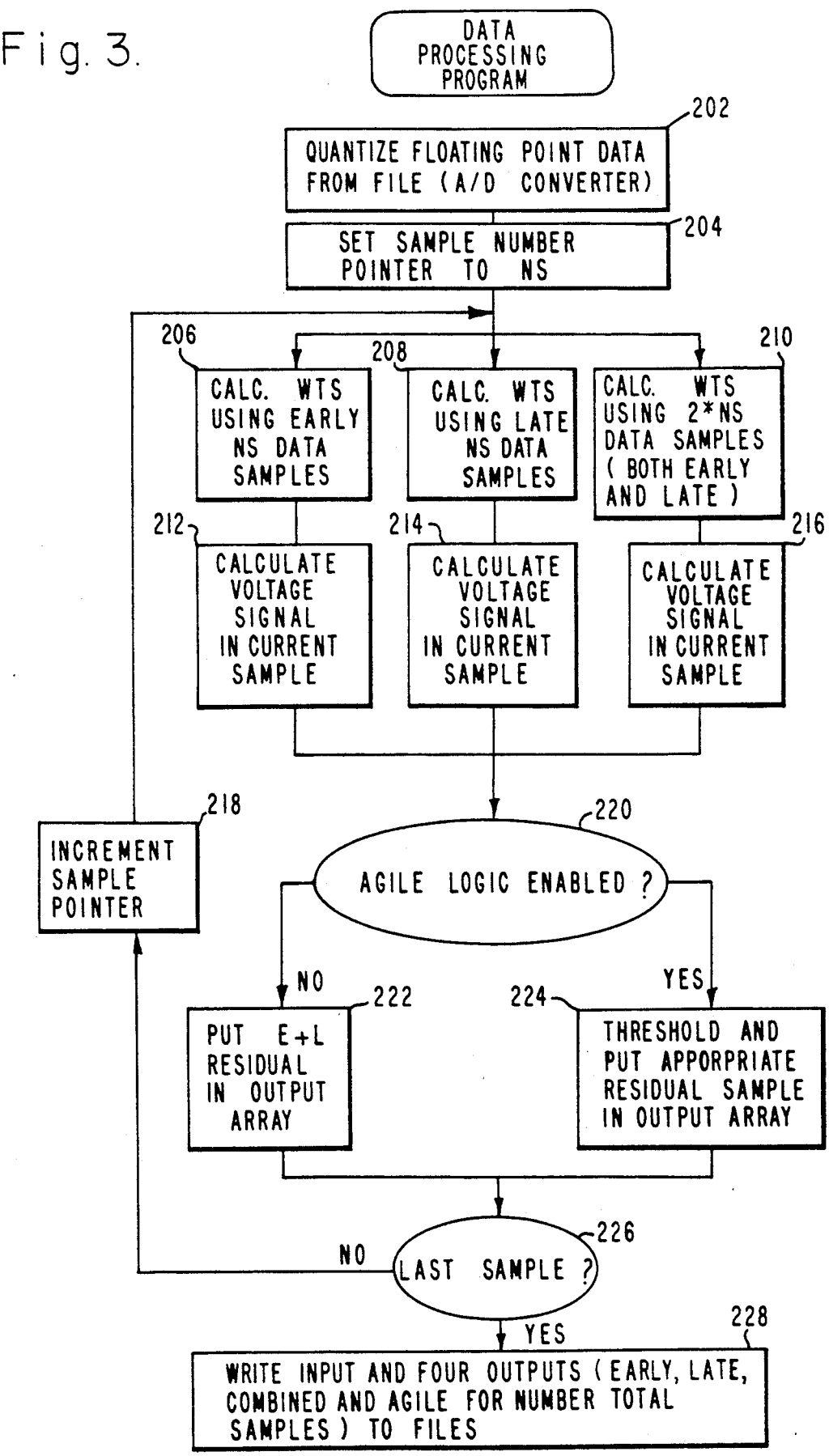
FIG. 3 illustrates a functional flow logic diagram representative of a computer program which may be employed to implement the present invention.

The polarization agile logic of the invention is computed also as set forth above, as further described by FIG. 3.

FIG. 3 is a functional flow diagram, in computer program logic format, illustrating an embodiment of Weight Selection and Application function 102 and Optimum Detection Channel Selection function 103. With reference to FIG. 2, as indicated by Block 102 of FIG. 3, $x_1(t)$, $x_2(t)$, $x_3(t)$, and $x_4(t)$ signal data in digital form is obtained from analog-to-digital (A/D) units 62, 64, 82, and 84 respectively and quantized. The data sample number is set to NS, as indicated by Block 204. The computations set forth in Blocks 206, 208, and 210 are then executed simultaneously, as for example, done by PSP computer 109 of FIG. 2, by ECCM Adaptive Weighting Calculations function 100. As explained above, the weighting values, or weights, $\hat{W}_E$, are calculated using the early NS (number of samples) data samples (Block 206); the weighting values, or weights, $\hat{W}_L$, are calculated using the late NS data samples (Block 208); and the weighting values, or weights, $\hat{W}_0$, are calculated using 2 times the 2NS data samples (both early and late data samples).

As indicated by Blocks 212, 214, and 216 of FIG. 3, as explained in detail above, for Weight Selection and Application function 102, the respective voltage signals for current signal data sample, respectively yielding $\hat{x}_1(t)$, $\hat{x}_2(t)$, $\hat{x}_3(t)$ and $\hat{x}_4(t)$, as shown in FIG. 2. These signals are then added in PSP computer 109, by summer 99, yielding $y_E(t)$, $y_L(t)$, and $y_0(t)$.

As shown in FIG. 3, Blocks 220–224, if the agile logic for the invention is enabled, Optimum Detection Channel Selection function 103 accomplishes the signal logic, as explained in detail above, and stores the residual data sample in an output array. This is effectively the resulting output signal, Y(t), of the invention and, as depicted in FIG. 3, is applied to the target detection channel of the radar system in which the invention is incorporated.

The computer logic then checks whether the data sample is the last, as shown in FIG. 3, Block 226. If it is the last sample, the values of the input signals and computed signals are stored for the total number of data samples. If it is not the last sample, the calculations are repeated as indicated in FIG. 3.

3. Use of the Invention

The invention described above is embodied in a signal processing computer, either as programmed in software or hard-wired in hardware of a special purpose computer for use, for example, in a radar system. As such, the invention operates automatically, by obtaining data from the antenna of the radar system and processing the data to ultimately provide the result (signal Y(t)) to another part of the radar system processor (for example, the target detection channel processing) for utilization.

The above description describes certain preferred embodiments of the present invention, and it is contemplated that various modifications to the above can be effected, but nevertheless come within the scope of the present invention as defined by the claims.

I claim:

1. In a radar system having a dual-polarization monopulse atenna, a computer processor, and target detection channels, the process for cancelling the effects of noise jamming produced by a hostile electronic countermeasure on a target to detect the target with optimum detection channel signal consisting the steps of:

obtaining signals from dual-polarization monopulse sub-aperture combinations of said atenna;
sampling said signals from said atenna;
digitizing said sampled signals;
dividing said samples of said digitized signals into early sample values and late sample values for polarization agile jammers;
calculating combination values based upon said samples of said digitized signals;
computing several potential target detection channel signals based upon said combination values and said samples of said digitized signals;
applying said detection channel signals to said computer processor; and
selecting the optimum detection channel signal for detection of said target using said computer processing whereby said signal is then applied to said target detection channels.

2. The process of claim 1 wherein the optimal detection channel signal is based upon the ratios calculated for polarization agile jammer.

3. A process of claim 1 of combining the signals from 2 dual-polarization monopulse apertures ($\Sigma$, $\Delta_{Az}$) wherein up to 3 constant polarization or polarization agile mainlobe or sidelobe jammers are simultaneously cancelled and targets are detected.

4. A process of claim 1 of combining the signals for 3 dual-polarization monopulse apertures ($\Sigma$, $\Delta_{Az}$, $\Delta_{El}$) wherein up to 5 constant polarization or polarization agile mainlobe or sidelobe jammers, are simultaneously cancelled and targets are detected.

* * * * *